Jan. 27, 1970

R. S. HANSEN 3,492,022

VEHICLE TOW BAR

Filed Jan. 24, 1968

INVENTOR
REUBEN S. HANSEN
By: Nolte and Nolte
ATTORNEYS

Jan. 27, 1970

R. S. HANSEN 3,492,022

VEHICLE TOW BAR

Filed Jan. 24, 1968

INVENTOR
REUBEN S. HANSEN
By: Nolte and Nolte
ATTORNEYS

Jan. 27, 1970  R. S. HANSEN  3,492,022
VEHICLE TOW BAR

Filed Jan. 24, 1968  3 Sheets-Sheet 3

INVENTOR
REUBEN S. HANSEN
By: Nolte and Nolte
ATTORNEYS

United States Patent Office 3,492,022
Patented Jan. 27, 1970

3,492,022
VEHICLE TOW BAR
Reuben S. Hansen, Yellow Grass, Saskatchewan, Canada, assignor to Hansen Industries Limited, Yellow Grass, Saskatchewan, Canada, a corporation of Canada
Filed Jan. 24, 1968, Ser. No. 700,054
Claims priority, application Canada, Aug. 15, 1967, 997,883
Int. Cl. B60d 1/14
U.S. Cl. 280—478          5 Claims

ABSTRACT OF THE DISCLOSURE

A vehicle tow bar including two extensible members, each comprising a longitudinal pipe member slidable with respect to an angle iron member and within sleeves welded to the angle iron member. Each extensible member is provided at one end with a hook-shaped portion and at the other end with a U-shaped clevis portion so that, in use, the extensible members form a V-shaped arrangement with the two U-shaped clevis portions together and connected to a towing vehicle by a common pin. The hook-shaped portions each hook into one of two spaced-apart eye members welded to the frame of the towed vehicle.

---

This invention relates to towing apparatus for connecting a towed vehicle to a towing vehicle. The invention is particularly suitable for constructing towing apparatus for use with an agricultural tractor and/or a farm implement.

Many forms of towing apparatus have previously been constructed for towing an agricultural wagon or truck behind a tractor or other type of agricultural machinery. Such towing apparatus has frequently comprised welded or bolted A-shaped frames. Since the frames were of rigid construction, they were, of course, very cumbersome and difficult to attach to the towed vehicle as well as difficult to attach to the towing vehicle.

In order to overcome the disadvantages of the above-mentioned towing apparatus, further towing apparatus has been used involving telescoping members arranged in a V-shaped configuration. However, such further towing apparatus has, in practice, proved to be extremely cumbersome and difficult to attach between a towed vehicle and a towing vehicle when one is concerned with agricultural implements. Furthermore, such towing apparatus has often required two men to lock it in position for towing.

It is an object of the present invention to provide improved towing apparatus for connecting a towed vehicle to a towing vehicle which is substantially easy to install between the two vehicles and such installation may well be carried out by one man.

Accordingly, there is provided, according to the present invention, towing apparatus for connecting a towed vehicle to a towing vehicle including an extensible member comprising: (a) a first elongate member having a pair of spaced-apart guide members integral therewith; (b) a second elongate member extending substantially parallel to said first member; (c) said guide members being adapted to maintain said second member substantially parallel to said first member; and (d) automatically-operable means for substantially preventing relative longitudinal movement of said first and second members when fully extended with respect to each other.

More particularly, the present invention provides towing apparatus for connecting a towed vehicle to a towing vehicle including two extensible members each comprising: (a) a first elongate member having a pair of spaced-apart guide members integral therewith; (b) a second elongate member extending substantially parallel to said first member; (c) said guide members being adapted to maintain said second member substantially parallel to said said first member; (d) automatically-operable means for substantially preventing relative longitudinal movement of said first and second members when fully extended with respect to each other; (e) each of said extensible members being provided at one end with a hook-shaped portion for attachment to a receiving portion on a towed vehicle and at the opposite end with a clevis portion; (f) whereby, in use, each hook-shaped portion is attached to a separate one of two spaced-apart receiving portions on a towed vehicle and the two extensible members are arranged in a substantially V-shaped arrangement with the two clevis portions overlapping with a pin-like member passing through apertures therein and through a corresponding aperture formed in a part of the towing vehicle to facilitate towing of the towed vehicle by the towing vehicle.

The invention will now be described, by way of example, with reference to the accompanying drawings in which.

Figure 1:
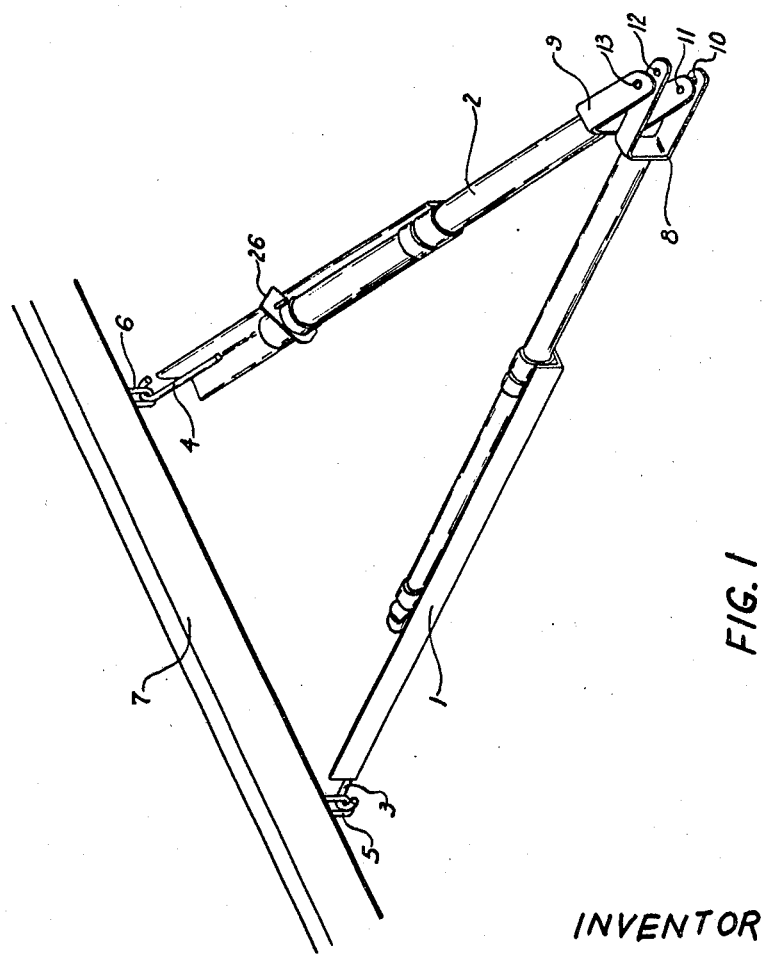
FIGURE 1 illustrates a perspective view of towing apparatus according to the present invention comprising two extensible members.

Referring to FIGURE 1, it will be seen that the tow- and 6 in the form of the members which are welded or the invention comprises two extensible members 1 and 2, each being provided with a hook-shaped portion 3 or 4 for attachment to corresponding receiving portions 5 and 6 in the form of eye members which are welded or bolted to the frame or bumper 7 of the towed vehicle.

The end of each extensible member 1 and 2 opposite to the hook-shaped portions 3 and 4 is provided with a clevis portion 8 or 9 which is so constructed as to have a 360° swivel action to facilitate attachement to the towing vehicle. Each arm of the U-shaped clevis portion is provided with an aperture 10, 11, 12 or 13 whereby when the two extensible members 1 and 2 are arranged in a V-shaped arrangement, as shown in FIGURE 1, then the two clevis portions 8 and 9 line up so that a pin-like member (not shown) may be passed through the apertures 10, 11, 12 and 13 which are then in alignment and also through a corresponding aperture formed in a part of the towing vehicle (not shown) whereby towing of the towed vechicle by the towing vechicle is facilitated. Such a pin is often referred to as a "draw pin."

The two extensible members 1 and 2 are similar and the detailed construction thereof will now be described with reference to FIGURES 1 to 4 and, for convenience, the extensible member 2 of FIGURE 1.

Figure 2:
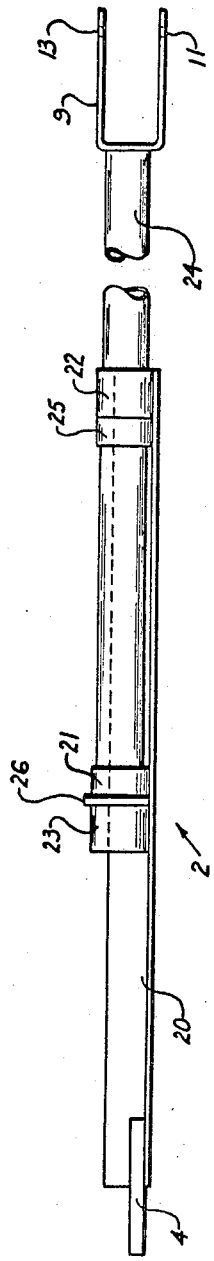
FIGURE 2 is a side view, partly in section, of one of one of the extensible members of FIGURE 1 in an extended position.

In FIGURE 2, the extensible member 2 is shown in its extended position and its overall length, as illustrated, is arranged to be 49".

The extensible member 2 comprises a first elongate member 20 in the form of a length of ¼" x 1¾" angle iron approximately 30" long. The angle iron member 20 is provided with a pair of spaced-apart guide members 21 and 22 in the form of sleeve members 21 and 22 having an internal diameter 1¾". The angle iron also carries a further integral sleeve member 23 which, as shown, is spaced a short distance from the sleeve member 21.

A second elongate member 24 extends substantially parallel to the angle iron member 20 and is adapted to slide in the sleeve guide members 21, 22 and 23, as shown in FIGURE 2. The elongate member 24 may well be constructed of an annular pipe having an internal diameter of 1¼" and an external diameter of 1⅝", its length being approximately 27". An integral sleeve-like member 25 is provided on the external surface of the pipe member and is welded thereto in such a manner that when the pipe 24 slides in the sleeve members 21 and 22, the sleeve-like member 25 is movable between the sleeve-like members 21 and 22. In this way, movement of the pipe member 24 is limited in each direction by the sleeve-like member 25 abutting against either the sleeve-like member 21 or the sleeve-like member 22, whilst the guide or sleeve-like members 21, 22 ensure that the movement of the pipe member 24 is maintained substantially parallel to the angle iron member 20 during its movement.

The sleeve-like guide members 21, 22 and 23 may, of course, be welded to the angle iron member 20 and the hook-shaped portion 4 is, as shown, welded to the opposite end of the angle iron member 20 to the guide member 22.

A locking plate 26 is pivotally mounted on the sleeve-like guide members 21 and 23 so as to be capable of dropping therebetween under gravity, as shown in FIGURE 2, when the extensible member is in an extended position. The locking plate is shown in a raised position in FIGURE 3 when the extensible member is in a closed position. However, the locking plate arrangement will be described in greater detail presently with reference to FIGURE 4.

As shown in FIGURE 2, the pipe member 24 is slidable within the sleeve-like guide members 21, 22 and 23 and at one end thereof there is welded, or otherwise integrally connected, the clevis portion 9 comprising two arm-like members containing the above-mentioned apertures 11 and 13. Because of its shape and the shape of the sleeve-like guide members, the pipe member 24 is clearly rotatable through 360° in a swivel action to facilitate attachment of the clevis portions at the end of the bar so as to locate the draw pin on the towing vehicle in a relatively simple manner.

In FIGURE 2, the extensible member is shown in an extended position and it will be seen that the sleeve-like member 25 which is welded to the pipe member 24 is in abutting relationship with the guide member 22 whilst the locking plate 26 is in a dropped position in which it is between the sleeve-like members 21 and 23 and thus prevents movement of the pipe member 24 in a longitudinal direction towards the hook-shaped portion 4. Similarly, the sleeve-like member 25 prevents movement of the pipe member 24 in a longitudinal direction away from the hook-shaped portion 4. Thus, the pipe member 24 is locked against longitudinal movement so as to provide a substantially rigid extensible member.

Figure 3:
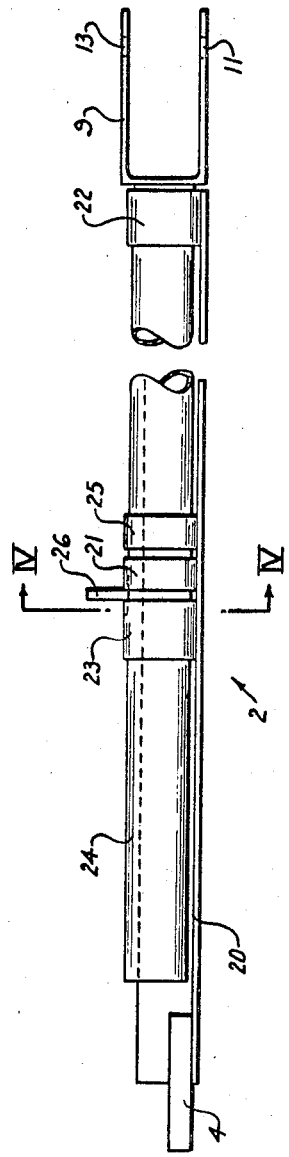
FIGURE 3 is a view similar to FIGURE 2 of an extensible member but in a closed position.

In FIGURE 3, the extensible member 2 is shown in a closed position with the locking plate 26 raised to permit the pipe 24 to move to the left in a sliding action controlled by the respective guide members until the sleeve-like portion 25 abuts against the sleeve-like guide member 21 and/or the clevis portion 9 abuts against the guide member 22 mounted on the angle iron member 20.

Figure 4:
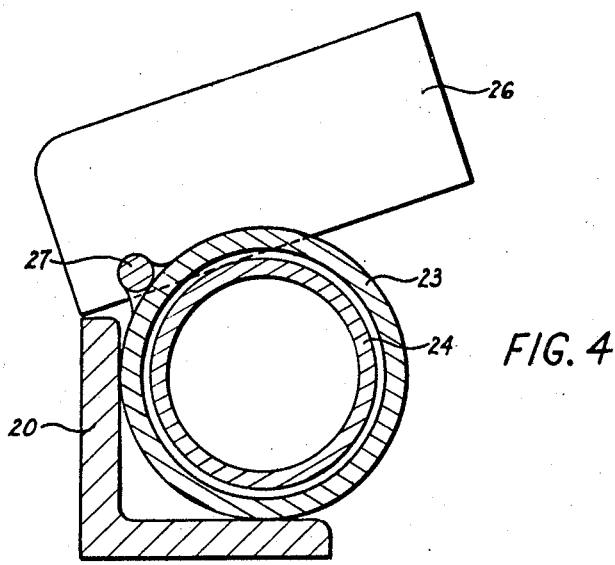
FIGURE 4 is a cross-sectional view taken on the line IV—IV of FIGURE 3 to illustrate the locking plate thereof.

Referring to FIGURE 4, it will be seen that the locking plate 26 is of substantially rectangular-shaped cross-section and is pivotally mounted on a ¼ inch rod 27 which extends between and is supported between the sleeve-like guide members 21 and 23 (FIGURES 2 and 3). The pipe member 24 can be clearly seen slidable within the guide member 23 welded to the angle iron member 20. As explained earlier, when the end of the pipe member 24 moves to the right in the extended position of FIGURE 2 so that the end of the pipe member 24 is within the sleeve-like guide member 21, then the locking plate 26 automatically pivots on the rod 27 so as to fall and prevent reverse motion of the pipe member 24 into the guide member 23. Thus, the pipe member 24 is prevented from longitudinal movement to the left by the locking plate 26 and is prevented from longitudinal movement to the right (FIGURE 2) by the sleeve-like member 25 abutting against the guide member 22. Thus, as explained, a substantially rigid extensible member is obtained.

Extensile member 1 is, of course, similar to the right hand extensible member 2 except that the hook-shaped member 3 and the respective locking plate 26 are so arranged as to provide a "left hand extensible member."

In use, the towing apparatus of FIGURE 1 comprising two extensible members 1 and 2 is attached to a vehicle 7 which is to be towed by merely inserting the hook-shaped members 3 and 4 into the corresponding eye-shaped members 5 and 6 mounted on the towed vehicle. The towing vehicle is then backed up to the towed vehicle and the clevis portions 8 and 9 are attached to the corresponding receiving portion on the towing vehicle and a drawpin (not shown) is inserted through the apertures 10, 11, 12 and 13 as well as through the aperture in the corresponding part of the towing vehicle. Since each of the extensible members 1 and 2 has a telescope-type action when the respective pipe members 24 (FIGURES 2 and 3) slide in the respective guide members 21, 22 and 23, and also since the clevis portions 8 and 9 are capable of a 360° swivel action, thus it is relatively simple to locate the draw pin on the towing vehicle even though the vehicle to be towed may be closer to the towing vehicle than would be desirable without the towing apparatus according to the present invention. In practice, it has been found that the vehicle to be towed may be up to 12" too close to the towing vehicle.

Furthermore, it has been found in practice that the vehicle to be towed can be up to 15" to the left or right of the centre line of the towing vehicle and the respective draw pin can still be inserted in the clevis portions 8 and 9 and the corresponding part of the towing vehicle. This is because of the telescope-type sliding action of the extensible members 1 and 2 and an extreme position is diagrammatically illustrated in FIGURE 5. In that figure, the towed vehicle and the towing vehicle are assumed not to be "in-line." The extensible member 1 is merely operated so that the respective pipe member 24 slides in the guide members 21, 22 and 23 until it is in the partially closed or closed position illustrated in FIGURE 3, whilst the pipe member 24 of the extensible member 2 is moved to the extended position of FIGURE 2.

Figure 5:
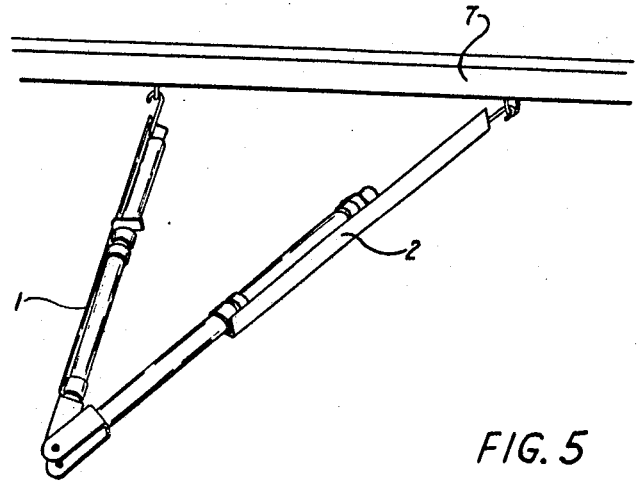
FIGURE 5 is a perspective view of the towing apparatus illustrated in FIGURE 1 and demonstrating its use when the towed vehicle is not in-line with the towing vehicle.

The respective clevis portions 8 and 9 are thus located as shown in FIGURE 5 and the respective draw-pin can be inserted through their apertures and through the aperture in the corresponding part on the towing vehicle.

If the towed vehicle is not in-line with the towing vehicle but is on the other side to that assumed in FIGURE 5, then it is merely necessary to move the extensible member 2 into a partially closed or closed position as shown in FIGURE 3 and to move the extensible member 1 into an extended or open position as shown in FIGURE 2. The draw-pin can then be inserted as before.

Whenever the draw pin has been correctly inserted, it is merely necessary for the operator of the towing vehicle to drive ahead slowly and the extensible members 1 and 2 are then pulled out until they reach their maximum extended position as shown in FIGURE 2. The respective locking plates 26 then automatically drop into place behind the respective pipe members 24 to limit the longitudinal movement of the respective pipe members, as mentioned above. A substantially rigid towing apparatus is thus formed.

The illustrated extensible members in one constructed arrangement had a 11½" telescoping action. However, it will be appreciated that the dimensions of the respective parts may be varied in accordance with the use to which the towing apparatus is to be put. In use with agricultural machinery, it was found that the illustrated towing apparatus comprising substantially self-locking, self-aligning, extensible members was particularly useful. It was found, in practice, that the use of the locking plate 26 was advantageous over an automatic pin or dog-type action in that there was less concern over wear as would be experienced using a pin in a hole arrangement.

Utilizing an angle iron member, a pipe and three sleeves welded to the angle iron and a fourth sleeve member welded midway on the pipe member, it was possible to obtain a particularly useful towing apparatus which, in use, performed more satisfactorily than previously known towing apparatus. The towing apparatus could be simply detached, separated into its different components and stored away, for example, in the truck or car.

In the above-described embodiment, two extensible members have been arranged in a V-shaped arrangement to provide towing apparatus. This has a number of advantages, as explained above, but in certain instances a novel towing apparatus may be constructed by utilizing only one of the described extensible members. It will be appreciated that the invention, therefore, extends to towing apparatus including only one of the described extensible members 1 or 2.

It will furthermore be appreciated that the sleeve-like guide members 21 and 23 (FIGURE 2) may, if desired, be of a single construction having a guide bore therein for guiding the pipe member 24 and having a suitable slot or space for receiving the locking plate 26.

I claim:
1. Towing apparatus for connecting a towed vehicle to a towing vehicle including an extensible member comprising:
 (a) a first elongate angle iron member having an attachment portion at one end for attachment, in use, to a corresponding receiving portion on a vehicle and a sleeve-like guide member integral with the other end of the angle iron member;
 (b) a further two sleeve-like guide members integrally attached to said angle iron member substantially midway between said attachment portion and the first mentioned guide member;
 (c) a locking plate pivotally mounted on said further two guide members so as to be pivotally movable from a first position out of the space between said further two guide members into a second position between said further two guide members so as to provide an obstruction to the bore passing therethrough;
 (d) a second elongate pipe member extending substantially parallel to said first angle iron member and slidable in said guide members mounted thereon;
 (e) a sleeve-like member integral with and on the external surface of said pipe member substantially midway along its length and movable between the first-mentioned guide member and one of the further two guide members integral with the angle iron member so as to restrict the longitudinal movement of said pipe member parallel to said angle iron member;
 (f) the free end of said pipe member remote from said attachment portion being provided with a portion having arms substantially parallel to the longitudinal axis of the extensible member, each arm being provided with an aperture capable of receiving a draw pin whereby the extensible member may be connected by said clevis portion and draw pin to a corresponding part of a vehicle;
 (g) the arrangement being such that when said locking plate is moved to its first position, then said pipe member may be moved in a first direction to close said extensible member and when said pipe member is moved in a direction opposite to said first direction for a predetermined distance, then said locking plate automatically moves to its second position whereby it is located in the space between said further two guide members;
 (h) whereby longitudinal movement of said pipe member in one direction is prevented by the end of said pipe member abutting against said locking plate and longitudinal movement in an opposite direction is prevented by the sleeve-like member integral with said pipe member abutting against said first-mentioned guide member integral with said angle iron member.

2. Towing apparatus according to claim 1 wherein said attachment portion is a hook-shaped portion and said corresponding receiving portion is an eye-shaped portion.

3. Towing appartus for connecting a towed vehicle to a towing vehicle including two extensible members each comprising:
 (a) a first elongate member having a pair of spaced-apart guide members integral therewith;
 (b) a second elongate member extending substantially parallel to said first member;
 (c) said guide members being adapted to maintain said second member substantially parallel to said first member;
 (d) automatically-operable means for substantially preventing relative longitudinal movement of said first and second members when fully extended with respect to each other;
 (e) each of said extensible members being provided at one end with an attachment portion for attachment to a receiving portion on a towed vehicle and at the opposite end with a clevis portion;
 (f) whereby, in use, each attachment portion is attached to a separate one of two spaced-apart receiving portions on a towed vehicle and the two extensible members are arranged in a substantially V-shaped arrangement with the two clevis portions overlapping with a pin-like member passing through apertures therein and through a corresponding aperture formed in a part of the towing vehicle to facilitate towing of the towed vehicle by the towing vehicle.

4. Towing apparatus according to claim 3 wherein each extensible member comprises:
 (a) a first elongate angle iron member having a hook-shaped portion at one end for attachment, in use, to an eye-shaped portion on a vehicle and a sleeve-like guide member integral with the other end of the angle iron member;
 (b) a further two sleeve-like guide members integrally attached to said angle iron member substantially midway between said hook-shaped portion and the first-mentioned guide member;
 (c) a locking plate pivotally mounted on said further two guide members so as to be pivotally movable from a first position out of the space between said further two guide members into a second position between said further two guide members so as to provide an obstruction to said bore passing therethrough;
 (d) a second elongate pipe member extending substantially parallel to said first angle iron member and slidable in said guide members mounted thereon;
 (e) a sleeve-like member integral with and on the external surface of said pipe member substantially midway along its length and movable between the first-mentioned guide member and one of the further two guide members integral with the angle iron member so as to restrict the longitudinal movement of said pipe member parallel to said angle iron member;
 (f) the free end of said pipe member remote from said hook-shaped portion being provided with a clevis portion having arms substantially parallel to the longitudinal axis of the extensible member, each arm being provided with an aperture capable of receiving a draw pin whereby the extensible member may be connected by said clevis portion and draw pin to a corresponding part of a vehicle;

(g) the arrangement being such that when said locking plate is moved to its first position, then said pipe member may be moved in a first direction to close said extensible member and when said pipe member is moved in a direction opposite to said first direction for a predetermined distance, then said locking plate automatically moves to its second position whereby it is located in the space between said further two guide members;

(h) whereby longitudinal movement of said pipe member in one direction is prevented by the end of said pipe member abutting against said locking plate and longitudinal movement in an opposite direction is prevented by the sleeve-like member integral with said pipe member abutting against said first-mentioned guide member integral with said angle iron member.

5. Towing apparatus according to claim 3 wherein each attachment portion is a hook-shaped portion.

References Cited

UNITED STATES PATENTS

| | | | |
|---|---|---|---|
| 2,794,657 | 6/1957 | Anderson | 280—477 |
| 2,804,316 | 8/1957 | Derksen | 280—491 |
| 2,854,251 | 9/1958 | Able | 280—494 X |
| 3,169,782 | 2/1965 | Columbus | 280—478 |
| 3,279,819 | 10/1966 | Edmonds | 280—478 |
| 3,284,101 | 11/1966 | Arnold | 280—482 |
| 3,419,285 | 12/1968 | Morehouse | 280—478 |

FOREIGN PATENTS 436,748  11/1926  Germany.

LEO FRIAGLIA, Primary Examiner

U.S. Cl. X.R.

280—491, 493